(12) United States Patent
Inazumi

(10) Patent No.: US 7,948,201 B2
(45) Date of Patent: May 24, 2011

(54) INDUCTION MOTOR CONTROL DEVICE

(75) Inventor: Masanobu Inazumi, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 250 days.

(21) Appl. No.: 12/473,977

(22) Filed: May 28, 2009

(65) Prior Publication Data

US 2009/0237027 A1  Sep. 24, 2009

Related U.S. Application Data

(63) Continuation of application No. PCT/JP2007/072719, filed on Nov. 26, 2007.

(30) Foreign Application Priority Data

Nov. 28, 2006 (JP) ................................. 2006-319730

(51) Int. Cl.
*H02P 27/12* (2006.01)

(52) U.S. Cl. ........ 318/727; 318/801; 318/802; 318/732; 318/733; 318/738; 318/823; 318/825; 318/826; 318/828; 307/129; 307/131; 307/125; 307/130; 323/232; 323/233; 323/218; 323/293; 323/352

(58) Field of Classification Search ............... 318/727, 318/801, 802, 609, 610, 603, 732, 733, 738, 318/823, 825, 826, 828; 307/129, 131, 125, 307/130; 323/232, 233, 218, 293, 352
See application file for complete search history.

(56) References Cited

U.S. PATENT DOCUMENTS

| | | | | |
|---|---|---|---|---|
| 4,967,135 A | * | 10/1990 | Ashikaga et al. | 318/808 |
| 5,481,168 A | * | 1/1996 | Mutoh et al. | 318/432 |
| 5,650,700 A | * | 7/1997 | Mutoh et al. | 318/432 |
| 6,163,912 A | * | 12/2000 | Matsuura et al. | 8/159 |
| 6,194,864 B1 | * | 2/2001 | Kinpara et al. | 318/805 |
| 6,809,492 B2 | * | 10/2004 | Harakawa et al. | 318/609 |

FOREIGN PATENT DOCUMENTS

| | | |
|---|---|---|
| JP | 07-075398 | 3/1995 |
| JP | 08-019300 | 1/1996 |
| JP | 11-041996 | 2/1999 |

* cited by examiner

*Primary Examiner* — Rita Leykin
(74) *Attorney, Agent, or Firm* — Ditthavong Mori & Steiner, P.C.

(57) ABSTRACT

An induction motor control device includes an inverter circuit for driving an induction motor by outputting a command voltage, a current detector for detecting an output current, a magnetic flux estimation observer for generating an estimated magnetic flux, an estimated current, and a phase command for the motor using the command voltage and the output current, a primary angular speed estimator for estimating a primary angular speed using the estimated magnetic flux, a slip compensator for calculating a slip angular frequency using the output current, a first angular speed estimator for estimating a first angular speed using the primary angular speed and the output current, a second angular speed estimator for estimating a second angular speed using the output current, the estimated magnetic flux, and the estimated current, and a resistance estimator for estimating a secondary resistance value of the motor using the first and second angular speeds.

8 Claims, 3 Drawing Sheets

INDUCTION MOTOR CONTROL DEVICE

CROSS-REFERENCE TO RELATED APPLICATION

The present application is related to PCT Patent Application Ser. No. PCT/JP2007/072719 titled "Induction Motor Control Device and Its Control Method", and to Japanese Patent Application No. 2006-319730 filed at Japan Patent Office titled "Induction Motor Controller and Its Control Method", all of which are incorporated herein by reference.

BACKGROUND OF THE INVENTION

1. Field of the Invention

The present invention relates to an induction motor control device and its control method for improving the accuracy of speed control.

2. Description of Related Art

The calculation of a slip angular frequency ωs of an induction motor is carried out according to Equation (1) using the inverse of a secondary time constant (=Lm/R2) of the motor:

$$\omega s = \frac{R2 \cdot I\delta}{Lm \cdot I\gamma} \quad (1)$$

where R2 denotes the secondary resistance, Lm denotes the mutual inductance, Iγ denotes the γ-axis current, and Iδ denotes the δ-axis current.

Since the secondary time constant of the motor includes the secondary resistance (R2), temperature fluctuations of the motor may cause an error in the calculated value of the slip angular frequency ωs. Thus, speed-sensorless speed control may cause speed accuracy deterioration. For example, Japanese Unexamined Patent Application Publication No. 7-75398 proposes a technique for improving the accuracy of calculating a slip angular frequency by detecting a terminal voltage and current of an induction motor, computing excitation energy stored in the excitation inductance of the induction motor, and adjusting the secondary time constant of the motor.

SUMMARY OF THE INVENTION

An aspect of the present invention provides a control device having an inverter circuit for driving an induction motor by outputting a command voltage to the induction motor. The control device includes a primary angular speed estimator for determining an angular speed of the induction motor using two arithmetic expressions using the command voltage and an output current of the inverter circuit, and a resistance estimator for estimating a secondary resistance value of the induction motor so that two angular speed values determined using the arithmetic expressions match. The control device further includes a slip compensation adjuster for setting the estimated secondary resistance value in at least one of a magnetic flux estimation observer and a slip compensator, which is used for the calculation of the angular speed.

Another aspect of the present invention provides a control method of a control device having an inverter circuit for driving an induction motor by outputting a command voltage to the induction motor. The control method includes the steps of detecting an output current of the inverter circuit, calculating an estimated magnetic flux, an estimated current, and a phase command using the command voltage and the detected current, estimating a primary angular speed using the estimated magnetic flux, calculating a slip angular frequency using the detected current, estimating a first angular speed using the estimated primary angular speed and the detected current, estimating a second angular speed using the detected current, the estimated magnetic flux, and the estimated current, and estimating a secondary resistance of the induction motor using the first angular speed and the second angular speed.

BRIEF DESCRIPTION OF THE DRAWINGS

Exemplary embodiments of the present invention will be described in detail based on the following figures, wherein.

DETAILED DESCRIPTION OF THE PREFERRED EMBODIMENTS

First, a description will be given of a principle of the present invention. A magnetic flux estimation observer for estimating a motor magnetic flux calculates a motor magnetic flux Φ_hat. An angular speed of an induction motor is calculated according to two different arithmetic expressions using the calculated motor magnetic flux Φ_hat. The motor magnetic flux Φ_hat includes a γ-axis component Φγ_hat and a δ-axis component Φδ_hat.

One of the arithmetic expressions for determining the angular speed is given by Equation (2). A first estimated angular speed ωr_hat1 is calculated using Equation (2):

$$\omega r\_hat1 = kp1 \cdot \tan^{-1}\left(\frac{\Phi\delta\_hat}{\Phi\gamma\_hat}\right) + ki1 \cdot \int \tan^{-1}\left(\frac{\Phi\delta\_hat}{\Phi\gamma\_hat}\right)dt - \omega s \quad (2)$$

where kp1 denotes the proportional gain and ki1 denotes the integral gain.

The other arithmetic expression is given by Equation (3). A second estimated angular speed ωr_hat2 is calculated using Equation (3):

$$\omega r\_hat2 = kp2 \cdot \{\Phi\delta\_hat \cdot (I\gamma - I\gamma\_hat) - \Phi\gamma\_hat \cdot (I\delta - I\delta\_hat)\} + \\ ki2 \cdot \int \{\Phi\delta\_hat \cdot (I\gamma - I\gamma\_hat) - \Phi\gamma\_hat \cdot (I\delta - I\delta\_hat)\}dt \quad (3)$$

where Iγ_hat and Iδ_hat denote the estimated γ-axis current and the estimated δ-axis current, respectively, which are calculated by the magnetic flux estimation observer, kp2 denotes the proportional gain, and ki2 denotes the integral gain.

Ideally, the calculation of the angular speed is performed in such a way that the first estimated angular speed ωr_hat1 and the second estimated angular speed ωr_hat2 are made to match each other. In general, however, they do not match. The reason for the mismatch is considered to be the occurrence of a set error in the secondary resistance (R2) due to temperature fluctuations of the motor, and the secondary resistance value is adjusted and estimated so that the first estimated angular speed ωr_hat1 and the second estimated angular speed ωr_hat2 match.

The estimated secondary resistance value obtained in this manner is set in at least one of the magnetic flux estimation observer and a slip compensator so that an slip angular frequency ωs or an angular speed ωr is accurately estimated.

Figure 4:
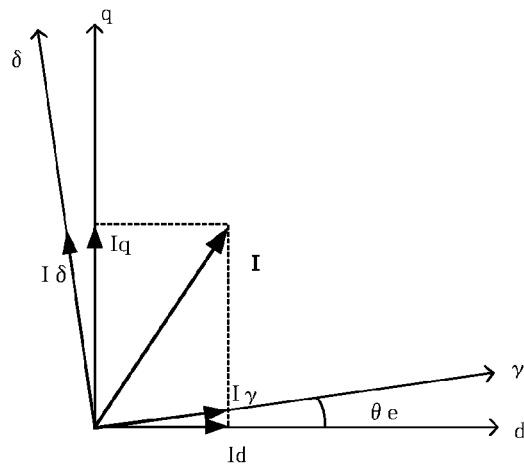
FIG. 4 is a diagram showing the relationship between the control coordinate γ-δ axes and the actual rotor coordinate d-q axes.

Next, a description will be given of the relationship between the control coordinate γ-δ axes used in the description of an embodiment of the present invention and the actual rotor coordinate d-q axes. The d axis denotes the direction of the magnetic flux of a rotor in the induction motor, and the q axis denotes a direction that is advanced 90 degrees with respect to the d axis. A control device according to this embodiment does not include a sensor for detecting a motor angular speed and does not allow direct measurement of the angular speed. Thus, it is difficult to detect the direction of the magnetic flux of the rotor (i.e., the d axis). To overcome this difficulty, motor control is performed on γ-δ axes in which an axis that is based on a phase command θref of the motor magnetic flux to be estimated is set as γ axis and in which an axis that is advanced 90 degrees with respect to the γ axis is set as δ axis. FIG. 4 is a diagram showing the relationship between the control coordinate γ-δ axes and the rotor coordinate d-q axes. In an ideal state of motor control, an angle θe defined between the γ axis and the d axis is zero.

An embodiment of the present invention will now be described with reference to the drawings.

Figure 1:
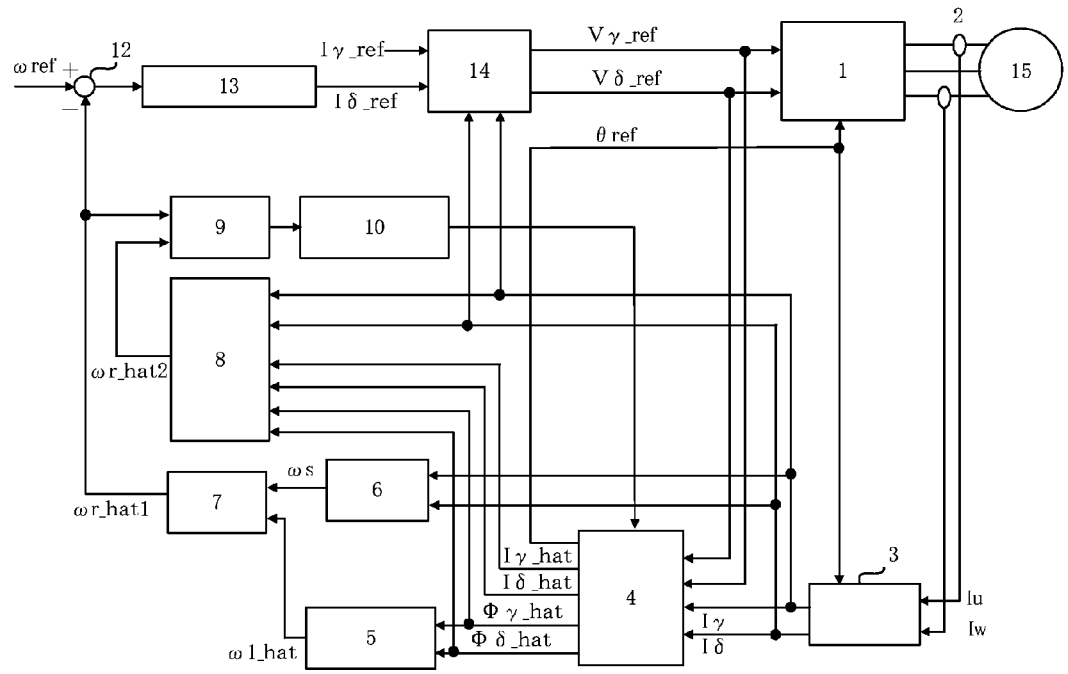
FIG. 1 is a block diagram of an induction motor control device according to a first exemplary embodiment of the present invention.

FIG. 1 is a block diagram of a control device for an induction motor according to a first embodiment of the present invention. The control device includes an inverter circuit 1, a current detector 2 for detecting output currents (Iu and Iw) of the inverter circuit 1, a current-coordinate converter 3, a magnetic flux estimation observer 4, a primary angular speed estimator 5, a slip compensator 6, a first angular speed estimator 7, a second angular speed estimator 8, a resistance adjuster 9, an observer adjuster 10, a subtractor 12, a speed controller 13, a current controller 14, and an induction motor 15.

The subtractor 12 subtracts a first estimated angular speed ωr_hat1, which will be described below, from a given angular speed command ωref, and determines Δωr. The speed controller 13 performs proportional plus integral control of Δωr, and determines a torque current command Iδ_ref. The current controller 14 performs proportional plus integral control of the difference between the torque current command Iδ_ref and a δ-axis current Iδ, which will be described below, and calculates a γ-axis voltage command Vγ_ref. The current controller 14 further performs proportional plus integral control of the difference between a given exciting current command Iγ_ref and a γ-axis current Iγ, which will be described below, and calculates a δ-axis voltage command Vδ_ref. The induction motor 15 is connected to the inverter circuit 1.

The current-coordinate converter 3 performs coordinate conversion of the detected output currents (Iu and Iw) using a phase command θref, which will be described below, and calculates the γ-axis current Iγ and the δ-axis current Iδ.

The magnetic flux estimation observer 4 receives the γ-axis current Iγ, the δ-axis current Iδ, the γ-axis voltage command Vγ_ref, and the δ-axis voltage command Vδ_ref. The magnetic flux estimation observer 4 calculates a γ-axis component Φγ_hat and δ-axis component Φδ_hat of a motor magnetic flux Φ_hat, an estimated γ-axis current Iγ_hat, and an estimated δ-axis current Iδ_hat using Equation (4), and further calculates the phase command θref using Equation (5):

$$\frac{d}{dt}\begin{bmatrix} I\gamma\_\text{hat} \\ I\delta\_\text{hat} \\ \Phi\gamma\_\text{hat} \\ \Phi\delta\_\text{hat} \end{bmatrix} = \begin{bmatrix} -\frac{R1}{\sigma \cdot L1} - \frac{R2\_\text{hat} \cdot (1-\sigma)}{\sigma \cdot L2} & \omega 1\_\text{hat} & \frac{Lm \cdot R2\_\text{hat}}{\sigma \cdot L1 \cdot L2^2} & \frac{\omega s \cdot Lm}{\sigma \cdot L1 \cdot L2} \\ -\omega 1\_\text{hat} & -\frac{R1}{\sigma \cdot L1} - \frac{R2\_\text{hat} \cdot (1-\sigma)}{\sigma \cdot L2} & -\frac{\omega s \cdot Lm}{\sigma \cdot L1 \cdot L2} & \frac{Lm \cdot R2\_\text{hat}}{\sigma \cdot L1 \cdot L2^2} \\ \frac{Lm \cdot R2\_\text{hat}}{L2} & 0 & -\frac{R2\_\text{hat}}{L2} & \omega r\_\text{hat2} \\ 0 & \frac{Lm \cdot R2\_\text{hat}}{L2} & -\omega r\_\text{hat2} & -\frac{R2\_\text{hat}}{L2} \end{bmatrix} \begin{bmatrix} I\gamma\_\text{hat} \\ I\delta\_\text{hat} \\ \Phi\gamma\_\text{hat} \\ \Phi\delta\_\text{hat} \end{bmatrix}$$

$$+ \frac{1}{\sigma \cdot L1} \cdot \begin{bmatrix} V\gamma\_\text{ref} \\ V\delta\_\text{ref} \\ 0 \\ 0 \end{bmatrix} + \begin{bmatrix} g11 & g12 \\ g21 & g22 \\ g31 & g32 \\ g41 & g42 \end{bmatrix} \cdot \begin{bmatrix} I\gamma - I\gamma\_\text{hat} \\ I\delta - I\delta\_\text{hat} \end{bmatrix} \quad (4)$$

$$\theta ref = \int \tan^{-1}\left(\frac{\Phi\delta\_\text{hat}}{\Phi\gamma\_\text{hat}}\right) dt \quad (5)$$

In the calculation of Equation (4), a determinant in which the calculated result of R2_hat, which is R2 output from the observer adjuster 10, which will be described below, is reflected is used. In Equation (4), L1 denotes the motor primary inductance, L2 denotes the motor secondary inductance, g11, g12, g21, g22, g31, g32, g41, and g42 denote the observer gains, and σ denotes the motor leakage inductance. As is known in the art, the motor leakage inductance σ is determined using Equation (6):

$$\sigma = 1 - \frac{Lm^2}{L1 \cdot L2} \quad (6)$$

The inverter circuit 1 performs coordinate conversion of the γ-axis voltage command Vγ_ref and the δ-axis voltage command Vδ_ref, which have been obtained in the manner described above, using the phase command θref to calculate three-phase voltage commands (Vuref, Vvref, and Vwref). The inverter circuit 1 outputs the three-phase voltage commands (Vuref, Vvref, and Vwref) to the induction motor 15 to drive the induction motor 15.

The first estimated angular speed ωr_hat1 is calculated by subtracting a slip angular frequency ωs from a primary angular speed ω1_hat. This subtraction is performed by the first angular speed estimator 7. The primary angular speed ω1_hat is calculated by the primary angular speed estimator 5 using Equation (7):

$$\omega 1\_hat = kp1 \cdot \tan^{-1}\left(\frac{\Phi\delta\_hat}{\Phi\gamma\_hat}\right) + ki1 \cdot \int \tan^{-1}\left(\frac{\Phi\delta\_hat}{\Phi\gamma\_hat}\right)dt \quad (7)$$

The slip angular frequency ωs is calculated by the slip compensator 6 using Equation (1) above.

A second estimated angular speed ωr_hat2 is calculated by the second angular speed estimator 8 using Equation (3) above.

The estimated secondary resistance value R2_hat is determined by the resistance adjuster 9 as a result of the proportional plus integral control of the difference between the first estimated angular speed ωr_hat1 and the second estimated angular speed ωr_hat2. The estimated secondary resistance value R2_hat is used for the computation of each element of the determinant in Equation (4) above, which is performed by the observer adjuster 10. The result of this computation is set in the magnetic flux estimation observer 4.

In this manner, the estimated secondary resistance value R2_hat is determined so that the first estimated angular speed ωr_hat1 and the second estimated angular speed ωr_hat2 are made to match each other, and an angular speed ωr is calculated using the estimated secondary resistance value R2_hat.

Figure 2:
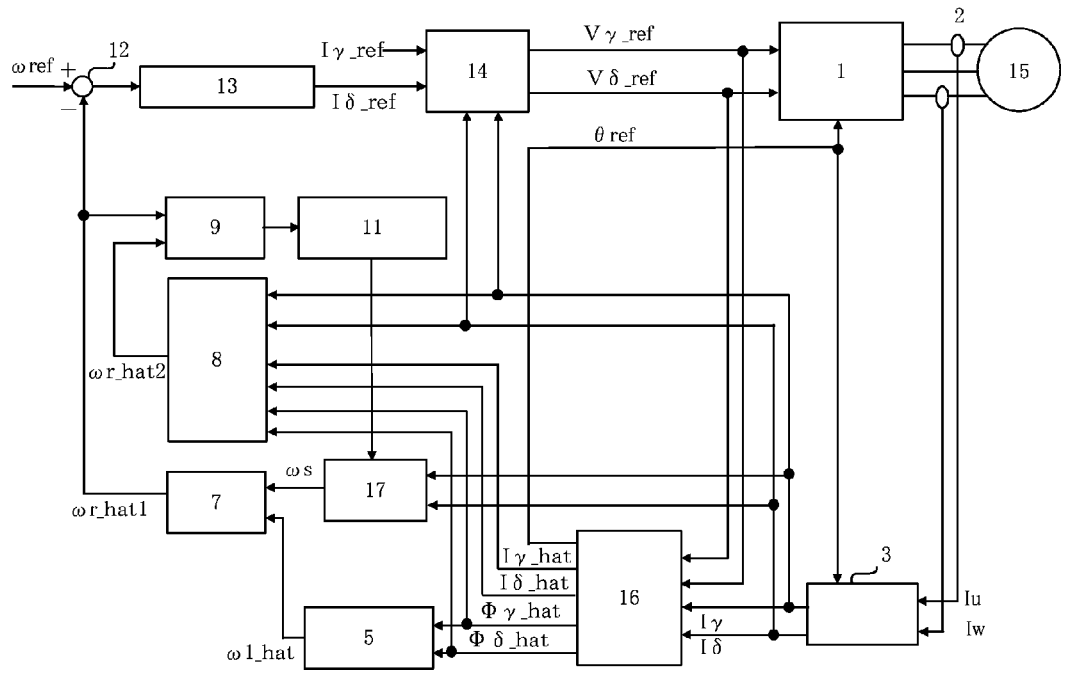
FIG. 2 is a block diagram of an induction motor control device according to a second exemplary embodiment of the present invention.

FIG. 2 is a block diagram of a control device for an induction motor according to a second embodiment of the present invention. The control device shown in FIG. 2 is different from the control device shown in FIG. 1 in that the observer adjuster 10, magnetic flux estimation observer 4, and slip compensator 6 shown in FIG. 1 are replaced with a slip compensation adjuster 11, a magnetic flux estimation observer 16, and a slip compensator 17, respectively. Other elements are represented by the same reference numerals as those shown in FIG. 1, the operation of which is similar to the operation of those shown in FIG. 1, and descriptions thereof are omitted.

The slip compensation adjuster 11 outputs the estimated secondary resistance value R2_hat input from the resistance adjuster 9 to the slip compensator 17.

The magnetic flux estimation observer 16 receives the γ-axis current Iγ, the δ-axis current Iδ, the γ-axis voltage command Vγ_ref, and the δ-axis voltage command Vδ_ref. The magnetic flux estimation observer 16 calculates a γ-axis component Φγ_hat and δ-axis component Φδ_hat of a motor magnetic flux Φ_hat, an estimated γ-axis current Iγ_hat, and an estimated δ-axis current Iδ_hat using an equation obtained by replacing R2_hat with R2 in the determinant in Equation (4) above. The magnetic flux estimation observer 16 further calculates the phase command θref using Equation (5) above.

The slip compensator 17 calculates a slip angular frequency ωs using an equation obtained by replacing R2 with R2_hat in Equation (1) above.

In this manner, the slip angular frequency ωs is calculated using the estimated secondary resistance value R2_hat that is determined so that the first estimated angular speed ωr_hat1 and the second estimated angular speed ωr_hat2 are made to match each other.

Figure 3:
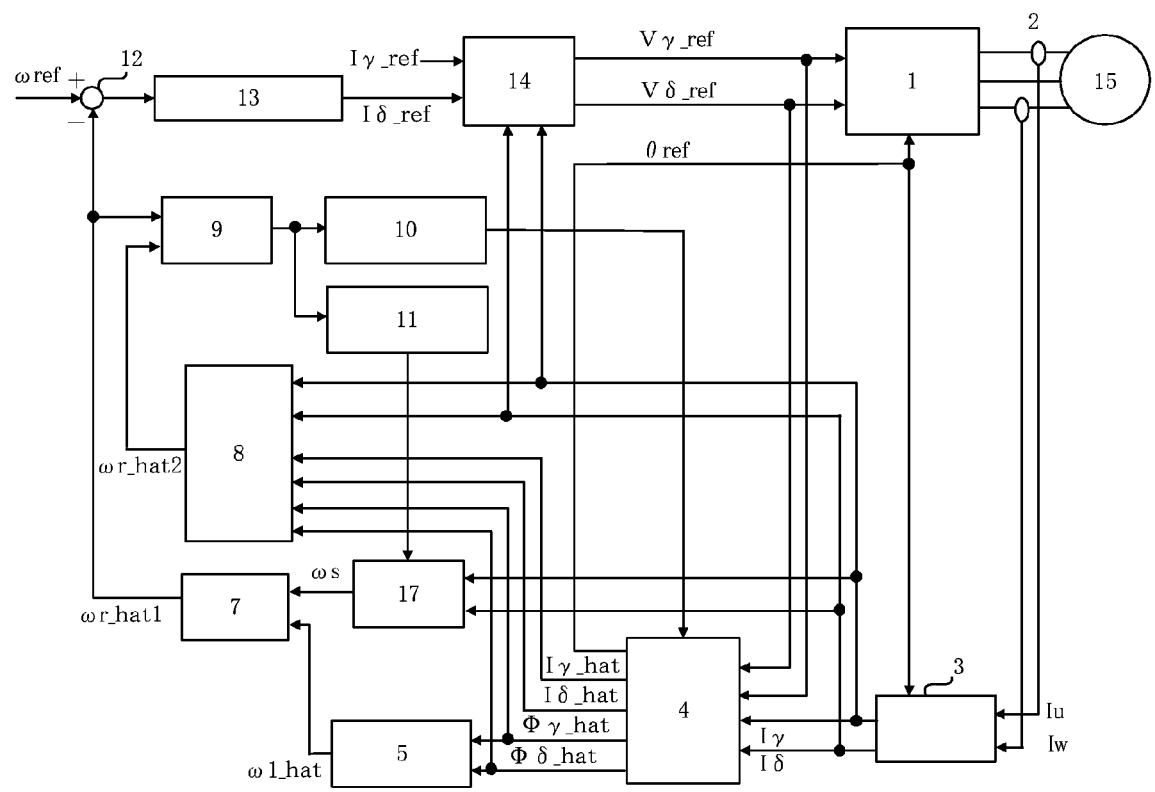
FIG. 3 is a block diagram of an induction motor control device according to a third exemplary embodiment of the present invention.

Further, as in a block diagram shown in FIG. 3, a control device for an induction motor may include both the observer adjuster 10 and the slip compensation adjuster 11 and may be configured such that the estimated secondary resistance value R2_hat is set in both the magnetic flux estimation observer 4 and the slip compensator 17.

Figure 5:
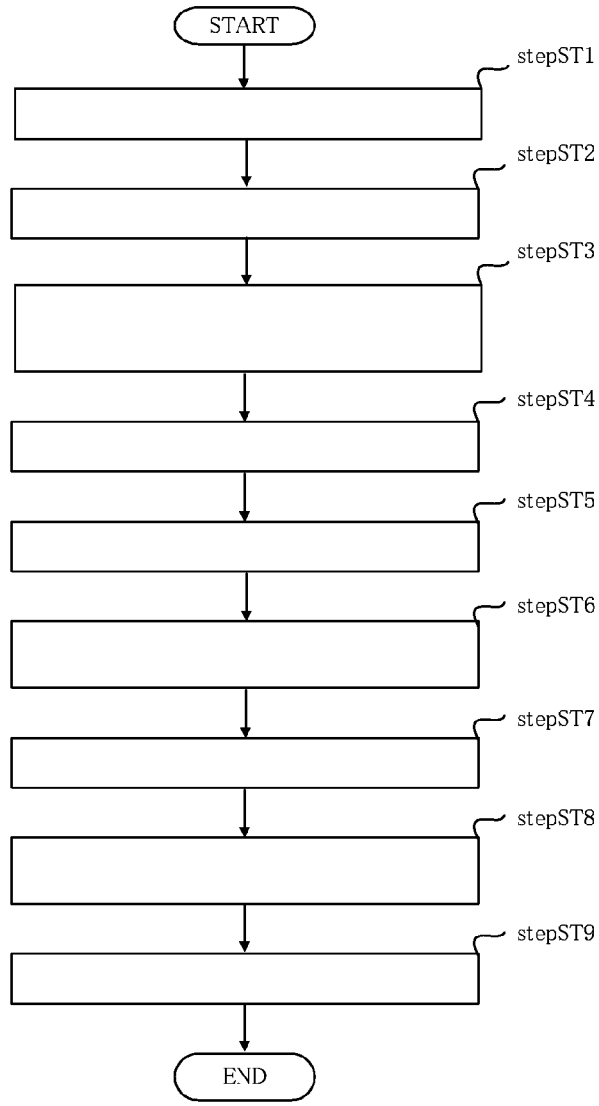
FIG. 5 is a flowchart showing a control method of an induction motor control device of the present invention.

FIG. 5 is a flowchart showing a control method of an induction motor control device of the present invention. Here, a main section that estimates and uses a secondary resistance of an induction motor will be described.

In step ST1, output currents (Iu and Iw) of the inverter circuit 1 that converts the γ-axis voltage command Vγ_ref and the δ-axis voltage command Vδ_ref into three-phase voltage commands and that outputs the three-phase voltage commands to the induction motor 15 are detected.

In step ST2, the γ-axis current Iγ and the δ-axis current Iδ are calculated by performing coordinate conversion using the detected output currents and the phase command θref.

In step ST3, the γ-axis component Φγ_hat and δ-axis component Φδ_hat of the motor magnetic flux Φ_hat, the estimated γ-axis current Iγ_hat, and the estimated δ-axis current Iδ_hat are calculated according to Equation (4) above using the γ-axis voltage command Vγ_ref, the δ-axis voltage command Vδ_ref, the γ-axis current Iγ, and the δ-axis current Iδ. Further, the phase command θref is calculated using Equation (5) above.

In step ST4, the primary angular speed ω1_hat is calculated according to Equation (7) above using the γ-axis component Φγ_hat and δ-axis component Φδ_hat of the motor magnetic flux Φ_hat.

In step ST5, the slip angular frequency ωs is calculated based on Equation (1) above using the γ-axis current Iγ and the δ-axis current Iδ.

In step ST6, the slip angular frequency ωs is subtracted from the estimated primary angular speed ω1_hat to estimate a first angular speed which is represented by ωr_hat1.

In step ST7, a second angular speed which is represented by ωr_hat2 is estimated according to Equation (3) above using the γ-axis current Iγ, the δ-axis current Iδ, the estimated magnetic fluxes Φγ_hat and Φδ_hat, and the estimated currents Iγ_hat and Iδ_hat.

In step ST8, the secondary resistance (R2) of the induction motor 15 is estimated as a result of the proportional plus integral control of the difference between the first estimated angular speed ωr_hat1 and the second estimated angular speed ωr_hat2. The estimated secondary resistance value is represented by R2_hat.

In step ST9, the estimated secondary resistance value R2_hat is used for the computation of each element of the determinant in Equation (4) above.

In step ST9, alternatively, the estimated secondary resistance value R2_hat may be used for an arithmetic expression for calculating the slip angular frequency ωs, which is given in Equation (1) above. Alternatively, the estimated secondary resistance value R2_hat may be used for both the calculation of Equations (1) and (4) above.

According to the embodiments described above, an angular speed can accurately be estimated even when the secondary resistance changes due to temperature changes. The foregoing exemplary embodiments have been described in the context of the γ-δ axis coordinate system. In a modification, any other coordinate system may be used to carry out the present invention.

An induction motor control device according to an embodiment of the present invention is capable of improving the accuracy of speed-sensorless speed control of an induction motor, and can therefore also be applied to general industrial machines and to use in environments where it is difficult to use speed sensors, such as high-temperature and/or high-vibration environments.

What is claimed is:

1. An induction motor control device having an inverter circuit for driving an induction motor by outputting a command voltage to the induction motor, comprising:
    a current detector for detecting an output current of the inverter circuit;
    a magnetic flux estimation observer for generating an estimated magnetic flux, an estimated current, and a phase command for the induction motor using the command voltage and the detected output current;
    a primary angular speed estimator for estimating a primary angular speed of the induction motor using the estimated magnetic flux;
    a slip compensator for calculating a slip angular frequency of the induction motor using the output current;
    a first angular speed estimator for estimating a first angular speed of the induction motor using the primary angular speed and the output current;
    a second angular speed estimator for estimating a second angular speed of the induction motor using the output current, the estimated magnetic flux, and the estimated current; and
    a resistance estimator for estimating a secondary resistance value of the induction motor using the estimated first and second angular speeds.

2. The induction motor control device according to claim 1, further comprising:
    an observer adjuster for setting the estimated secondary resistance value in at least one of the magnetic flux estimation observer and the slip compensator.

3. The induction motor control device according to claim 1, wherein the magnetic flux estimation observer performs a calculation on γ-δ axes including γ axis and δ axis, the γ axis being determined based on the phase command, the δ axis being an axis that is advanced 90 degrees with respect to the γ axis.

4. The induction motor control device according to claim 1, wherein the primary angular speed estimator calculates the primary angular speed of the induction motor using the equation:

$$\omega1\_hat = kp1 \cdot \tan^{-1}\left(\frac{\Phi\delta\_hat}{\Phi\gamma\_hat}\right) + ki1 \cdot \int \tan^{-1}\left(\frac{\Phi\delta\_hat}{\Phi\gamma\_hat}\right) dt$$

where γ axis is determined based on the phase command of the estimated magnetic flux and δ axis is determined to be an axis that is advanced 90 degrees with respect to the γ axis.

5. The induction motor control device according to claim 1, wherein the first angular speed estimator calculates the first angular speed of the induction motor using the equation:

$$\omega r\_hat1 = kp1 \cdot \tan^{-1}\left(\frac{\Phi\delta\_hat}{\Phi\gamma\_hat}\right) + ki1 \cdot \int \tan^{-1}\left(\frac{\Phi\delta\_hat}{\Phi\gamma\_hat}\right) dt - \omega s$$

where γ axis is determined based on the phase command of the estimated magnetic flux and δ axis is determined to be an axis that is advanced 90 degrees with respect to the γ axis.

6. The induction motor control device according to claim 1, wherein the second angular speed estimator calculates the second angular speed of the induction motor using the equation:

$$\omega r\_hat2 = kp2 \cdot \{\Phi\delta\_hat \cdot (I\gamma - I\gamma\_hat) - \Phi\gamma\_hat \cdot (I\delta - I\delta\_hat)\} + ki2 \cdot \int \{\Phi\delta\_hat \cdot (I\gamma - I\gamma\_hat) - \Phi\gamma\_hat \cdot (I\delta - I\delta\_hat)\} dt$$

where γ axis is determined based on the phase command of the estimated magnetic flux and δ axis is determined to be an axis that is advanced 90 degrees with respect to the γ axis.

7. An induction motor control device having an inverter circuit for driving an induction motor by outputting a command voltage to the induction motor, comprising:
    means for detecting an output current of the inverter circuit;
    means for generating an estimated magnetic flux, an estimated current, and a phase command for the induction motor using the command voltage and the detected output current;
    means for estimating a primary angular speed using the estimated magnetic flux;
    means for calculating a slip angular frequency using the output current;
    means for estimating a first angular speed using the primary angular speed and the output current;
    means for estimating a second angular speed using the output current, the estimated magnetic flux, and the estimated current; and
    means for estimating a secondary resistance value of the induction motor using the estimated first and second angular speeds.

8. The induction motor control device according to claim 7, further comprising means for setting the estimated secondary resistance value in at least one of the means for generating an estimated magnetic flux and the means for calculating a slip angular frequency.

* * * * *